United States Patent [19]

Braeken et al.

[11] Patent Number: 4,962,135

[45] Date of Patent: Oct. 9, 1990

[54] SELF POLISHING ANTI-FOULING PAINTS

[75] Inventors: Jozef Braeken, Denderleeuw; Jean-Paul Dekerk, Heverlee, both of Belgium; Hendrik van der Poel, Amstelveen, Netherlands; Jozef Verborgt, Uithoorn, Netherlands; Peter Haak, Heiloo, Netherlands

[73] Assignee: Labofina, S.A., Brussels, Belgium

[21] Appl. No.: 187,104

[22] Filed: Apr. 28, 1988

[30] Foreign Application Priority Data

Apr. 28, 1987 [GB] United Kingdom ............... 8710024
Feb. 19, 1988 [GB] United Kingdom ............... 8803948

[51] Int. Cl.$^5$ .................. C09D 5/14; C09D 5/16; C08K 3/20; C08K 3/24
[52] U.S. Cl. .................. 523/122; 524/271; 524/272; 524/197; 524/284; 524/300; 524/394; 524/398; 524/430; 524/432
[58] Field of Search ............ 523/122; 524/271, 272, 524/197, 430, 432, 284, 300, 394, 398

[56] References Cited

U.S. PATENT DOCUMENTS

| | | | |
|---|---|---|---|
| 4,675,051 | 6/1987 | Baxter | 706/16 |
| 4,687,792 | 8/1987 | Russell et al. | 523/122 |
| 4,761,439 | 8/1988 | Braeken et al. | 534/547 |
| 4,769,398 | 9/1988 | Kanda et al. | 523/122 |

FOREIGN PATENT DOCUMENTS

| | | |
|---|---|---|
| 0051930 | 5/1982 | European Pat. Off. . |
| 0069559 | 1/1983 | European Pat. Off. . |
| 0151809 | 8/1985 | European Pat. Off. . |
| 0204444 | 12/1986 | European Pat. Off. . |
| 0218573 | 4/1987 | European Pat. Off. . |
| 61-231061 | 4/1985 | Japan . |
| 61-231062 | 4/1985 | Japan . |
| WO8402915 | 8/1984 | PCT Int'l Appl. . |
| WO8602660 | 5/1986 | PCT Int'l Appl. . |
| 1124297 | 8/1968 | United Kingdom . |
| 1457590 | 12/1976 | United Kingdom . |
| 2159827 | 12/1985 | United Kingdom . |

*Primary Examiner*—Allan M. Lieberman
*Attorney, Agent, or Firm*—Jim D. Wheelington; John K. Abokhair; M. Norwood Cheairs

[57] ABSTRACT

Self polishing anti-fouling marine paint compositions, that can be prepared free of organotin, comprise: (i) at least one sparingly soluble organic compound that is an organic acid or an organic acid salt preferably selected from rosin-based compounds, metal salts of saturated fatty acids, either branched-chain or alicyclic; (ii) a copolymer prepared from at least one acrylic monomer, at least one monomer selected from $C_1$–$C_4$ alkyl methacrylates and styrene, and at least one monomer selected from cyclic tertiary amides or imides having an alkenyl group; (iii) at least one sparingly soluble metalliferous pigment; (iv) at least one marine biocide which can also function as the pigment; and optionally (iv) one or more highly insoluble pigments.

26 Claims, No Drawings

SELF POLISHING ANTI-FOULING PAINTS

BACKGROUND OF THE INVENTION

The invention relates to new antifouling marine paint compositions, that can be prepared totally free of organotin and yet give coatings having self-polishing properties.

Self-polishing antifouling coatings are known in the art. These coatings gradually dissolve so that a fresh anti-fouling paint surface is continuously revealed as moving seawater smoothes the surface of the coating. British Patent No. 1,124,297 discloses a film-forming copolymer containing a triorganotin comonomer which gives self-polishing antifouling coatings.

The known self-polishing antifouling paints use binders which are linear polymers containing side groups also called leaving groups. These leaving groups are released from the polymer by reaction with seawater, the resulting residual polymer being sufficiently dispersible or soluble in seawater is then swept away from the paint surface. This results in exposing a fresh layer of the binder able to undergo a similar reaction with seawater.

Coatings from such self-polishing paints retain their initial smoothness and can even become smoother from the action of relatively moving water.

These coatings generally contain a biocide that is active against fouling. The biocide is usually present as a pigment in the paint and/or released as a leaving group. The gradual thinning of the paint film controls the release of the biocide thus delivering the biocide from the surface at a relatively constant rate.

Most self-polishing paints employ binders that have triorganotin ester leaving groups. The triorganotin ester readily undergoes hydrolysis, releasing these leaving groups from the binder. The self-polishing action of these paints is dependent upon this hydrolysis, and the released triorganotin then provides a biocidal action. Examples of such paints can be found in British Pat. Nos. 1,124,297 and 1,457,590, in European Patent Application Nos. 51,930, 151,809 and 218,573, and in Japanese Patent Application Nos. 231061/61 and 231062/61. British Patent Application No. 2,159,827 discloses similar paints with diorganotin leaving groups.

Many countries are introducing new stringent water quality programs, some of which call for a phased reduction in the organotin content of marine paints. There are also cost advantages in replacing the expensive triorganotin comonomers. Examples of low or no organotin content marine paints are found in European Pat. No. 69,559 which discloses a copolymer prepared from quinolinyl esters of olefinically unsaturated carboxylic acid with other olefinically unsaturated comonomers, and International Patent Application No. WO 84/02915 which suggests a wide range of organic leaving groups for use in antifouling paint binders. It has been found, however, that the binder in these type of marine paints generally does not hydrolyze quickly enough in seawater; and, therefore, these paints are not adequately self polishing.

European Patent Application No. 204,444, also discloses a marine paint that doesn't require organotin. This patent application discloses a binder that is a hydrolyzable polymer prepared with a triaryl(methyl) methacrylate comonomer. The esterification reactions with these comonomers, however, are more difficult than with triorganotin comonomers; therefore, the hydrolysis will be more difficult. Since the hydrolysis is difficult, satisfactory marine paint cannot be prepared using these binders with what is known today.

International Patent Application No. WO 86/02660 discloses certain polycarboxylic polymers, substantially non-ionic, which are changed by reaction with seawater into polycarboxylate polymers sufficiently dispersible or soluble. These polymers do not require organotin and can be used as binders for self-polishing antifouling paints. However, the resulting coatings swell when immersed, and the paints, that typically contain ZnO or cuprous oxide as the toxic agent, gel on storage. Both of these problems prevent the use of these binders in self-polishing antifouling marine paints.

There is therefore a need for organotin-free self-polishing antifouling marine paints which do not have these drawbacks.

OBJECTS OF THE INVENTION

It is an object of the present invention to provide improved self-polishing antifouling paints.

It is another object of the present invention to provide self-polishing antifouling paints substantially free of organotin.

It is yet another object of the present invention to provide self-polishing antifouling paints substantially free of organotin that give improved coatings useful for marine applications.

SUMMARY OF THE INVENTION

The Applicants have found a new type of marine paint composition that can be prepared without any organotin, giving self-polishing antifouling coatings.

The marine paint composition according to the present invention comprises:

(i) at least one sparingly soluble compound that is an organic acid or an organic acid salt; (ii) a copolymer prepared from at least one acrylic monomer, at least one monomer selected from $C_1$–$C_4$ alkyl methacrylates and styrene, and at least one monomer selected from cyclic tertiary amides or imides having an alkenyl group; (iii) at least one sparingly soluble metalliferous pigment; and (iv) at least one marine biocide which also preferably functions as the pigment.

DETAILED DESCRIPTION OF THE INVENTION

Applicants have unexpectedly discovered a marine paint composition that does not require any organotin to give good self-polishing antifouling properties. This composition more specifically comprises:

(i) at least one sparingly soluble compound that is an organic acid or an organic acid salt preferably selected from rosin-based compounds, metal salts of saturated fatty acids, either branched-chain or alicyclic, having 6 to 12 carbon atoms.

(ii) a copolymer prepared by the polymerization of
(a) about 5 to 40 wt. % of at least one monomer A of the general formula

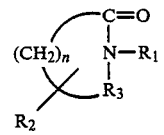

wherein $R_1$ is selected from H and alkyl groups when $R_2$ is an alkenyl group, $R_1$ is an alkenyl group when $R_2$ is selected from hydrogen and alkyl groups, $R_3$ is selected from methylene and carbonyl, and n is a positive integer,
- (b) about 5 to 45 wt. % of at least one acrylic comonomer B, wherein the amount of monomers A+B is between about 15 and 75 wt. % of the total monomers in the polymer, and
- (c) about 25 to 85 wt. % of at least one comonomer C selected from the group consisting of $C_1$–$C_4$ alkyl methacrylates and styrene;

(iii) at least one sparingly soluble metalliferous pigment; and (iv) at least one marine biocide;

wherein the weight ratio of said compound (i) to said copolymer (ii) is between about 1:50 and 70:30.

The invention is based upon a totally new concept in marine paints, i.e., the combination of a non-reactive binder with a slowly dissolving compound. This compound must be sparingly soluble. It is also believed that this compound must have a carboxyl group or the metal salt thereof. Although not wishing to be bound by theory, it is believed that the good properties of the marine paint may be due, at least in part, to some type of interaction between the carboxyl group of this compound and the N—CO parts on the copolymer.

According to a preferred embodiment of the present invention the compound of (i) above is selected from the group consisting of rosin-based compounds, sparingly soluble metal salts of saturated branched-chain fatty acids having 6 to 12 carbon atoms, sparingly soluble metal salts of saturated alicyclic fatty acids having 6 to 12 carbon atoms, and mixtures thereof. The more preferred compounds of this group being rosin-based or metal salts since good self-polishing antifouling paints have been prepared therefrom.

The expression "sparingly soluble" is known in the art of marine paint (see e.g. U.S. Pat. No. 4,407,997), where it characterizes some of the compounds usually defined as water-insoluble, as opposed to highly insoluble ones.

The metal salts used according to the present invention more preferably have 8 to 11 carbon atoms per molecule. This range of carbon atoms is more preferred since compounds with less carbons are a little too soluble and compounds with more carbons are a little too insoluble.

According to the present invention the preferred metal salts are generally transition metal salts, more preferably selected from zinc, copper, cobalt or zirconium salts, or mixtures thereof. The zinc and/or copper salts are most preferred since good marine paints have been prepared using these metal salts.

The metal salts used according to the present invention often contain a low percentage of the corresponding acids as one of the impurities. Examples of branched-chain acids that can be present include single-branched acids, among which 2-ethylhexanoic acid is preferred, or preferably tertiary acids. Examples of alicyclic acids that can be present include the naphthenic acids, which are a mixture of acids of which the structure is predominantly a cyclopentane ring with the carbonyl group at the end of an alkyl side-chain.

Rosins, used as the compound of (i) above, are within the broad scope of the present invention since rosins are sparingly soluble and have a carboxyl group or the corresponding salt. It is very surprising that compositions of the present invention, in which the compound of (i) above is a rosin, give self-polishing coatings, since the art teaches that rosin cannot be used in self-polishing paints (see WO 86/02660, page 2, paragraph 3). The rosin-based antifouling paints taught in the art can be divided into two groups according to the solubility of the matrix; soluble-matrix and insoluble-matrix. It is known that soluble-matrix rosin-based paints erode in service to form a brittle matrix of spent rosin which, although may be gradually washed from the hull surface by seawater, increases in roughness with time and has a very limited lifetime. On the other hand, insoluble-matrix rosin-based paints contain some vinyl resin and a lot of sparingly soluble pigments to open the surface; when the pigment is gradually washed by seawater, the surface becomes rougher because the binder is not washed away.

Rosin is a loosely used term, denoting the result of the harvesting of the gum exudations from surface cuts made in certain species of trees. The most important rosin is rosin from pines. Other processes for obtaining rosin include dissolving wood rosin from pine stumps after forests have been felled, or refining a by-product of the Kraft paper manufacturing process to produce tall oil rosin.

Pine-originating rosin is the preferred rosin used in the present invention, due to its availability and lower cost. Although this rosin is preferred, similar products can be used provided that they have similar qualities, including hydrophilic/lipophilic balance.

The principal component (about 80 wt. %) of rosin is abietic acid, also called sylvic acid (Chemical Abstracts Service Registry Number: 514-10-3), which can be used instead of rosin. The preferred rosin-based components, based on availability, are rosin itself, its copper or zinc derivatives, hereinafter called copper resinate and zinc resinate, other resinic salts having a comparable solubility, or mixtures thereof.

The resinic salts can be prepared by any known method, typically by metathesis with the metal carbonate, hydroxide or hydroxycarbonate. In some cases, the transformation of abietic acid into the salt thereof may upgrade properties like the melting point, hardness, durability, water, and/or solvent resistance.

It is known that reactions can occur within the paint, for example abietic acid can partially react with other components of the paint like ZnO, $Cu_2O$ or tributyltin oxide, or partial methathesis can occur between metal resinates or metal salts of fatty acids and other metal derivatives contained in the paint.

The non-reactive binder is a copolymer prepared by polymerization of (a) about 5 to 40 wt. % of at least one comonomer A of the general formula

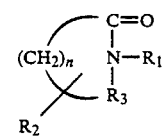

wherein either $R_1$ is an alkenyl group and $R_2$ is selected from H and alkyl groups or $R_2$ is an alkenyl group and $R_1$ is selected from H and alkyl groups, $R_3$ is selected from methylene and carbonyl, and n is an integer, preferably 1 to 4.

(b) about 5 to 45 wt. % of at least one acrylic comonomer B, with the total of A+B amounting to about 15 to 75 wt. % of the total monomers in the polymer, and (c) the balance being about 25 to 85 wt. % of at least one $C_1$–$C_4$ alkyl methacrylate and/or styrene comonomer C.

Monomer A can be any monomer, or combination of monomers that is covered by the description in (a) above but is preferably selected from cyclic tertiary amides having a vinyl or alkenyl function. Based on availabities, the most preferred monomers are N-vinylpyrrolidone, N-vinylpiperidone, and N-vinylcaprolactam.

The A monomers represent about 5 to 40 wt. % of total monomers, preferably about 15 to 30 wt. %. If amounts greater than about 40 wt. % are used, the resulting coating swells in the seawater, and hence would have poor mechanical properties. On the other hand, if amounts lower than about 5 wt. % are used, the resulting copolymer does not have the desired properties e.g. no self-polishing effect.

The B comonomers are well known in the film-forming art. Preferred examples of acrylic monomers, based on availability, include methyl acrylate, ethyl acrylate, propyl acrylate, butyl acrylate, amyl acrylate, hexyl acrylate, 2-ethylhexyl acrylate, the like and mixtures thereof, the most preferred being butyl acrylate.

The B comonomers represent about 5 to 45 wt. % of the monomers, preferably about 15 to 40 wt. %. When using higher amounts of B comonomers, the resulting coating is excessively soft and sensitive to mechanical damage.

The C comonomers represent about 25 to 85 wt. % of the monomers, preferably about 35 to 65 wt. %. The preferred comonomer C is methyl methacrylate based on availability.

Comonomers B and C are preferably esters, however, up to about 5 wt. % of these esters can be replaced with the corresponding acid, i.e. up to about 5 wt. % acrylic and/or methacrylate acid comonomers. Care must be taken, however, to avoid gelation of the paint when using a copolymer containing free acid functions.

The binder can be prepared by any conventional polymerization process but is preferably carried out by addition polymerization using a free radical catalyst, such as benzoyl peroxide, t-butyl peroxybenzoate, t-butyl peroxy 2-ethylhexanoate or azobis-isobutyronitrile, in an organic solvent such as xylene, toluene, butyl acetate, butanol, 2-ethoxy ethanol, cyclohexanone, 2-methoxy ethanol, 2-butoxy ethanol, methyl isobutyl ketone, methyl isoamyl ketone, methyl amyl ketone, ethyl amyl ketone, and/or 2-ethoxyethylacetate. The polymerization can be carried out by heating all the ingredients in the solvent or preferably by gradually adding the monomers and catalyst to the heated solvent. A chain transfer agent such as a mercaptan can also be used to produce polymers of lower molecular weight.

The polymerization is preferably carried out between about 70° and 140° C., more preferably below the lowest boiling temperature of all components in the mixture yet high enough for rapid polymerization. The most preferred organic solvent is xylene, based on availability and ease of use.

The weight ratio of the sparingly soluble compound, such as rosin and/or metal salt of a fatty acid to the binder is about 1:50 to 70:30. When a rosin-based component is used the weight ratio is about 10:90 to 70:30, preferably about 20:80 to 60:40 with 25:75 to 50:50 being most preferred since good results are obtained within this range. When a metal salt of a fatty acid is used the weight ratio is about 1:50 to 1:1, preferably about 1:35 to 3:4 with 1:20 to 2:3 being most preferred since good results are obtained within this range.

The paint composition according to the present invention also comprises at least one sparingly soluble metalliferous pigment, and optionally other biocides and/or one or more pigments which are highly insoluble in seawater.

Examples of metalliferous pigments that are sparingly soluble in seawater include cuprous thiocyanate, cuprous oxide, zinc oxide, cupric acetate meta-arsenate, and zinc chromate.

The paint preferably includes at least one metalliferous pigment selected from zinc oxide, cuprous oxide, cuprous thiocyanate, and other pigments having similar seawater solubility. These pigments have a seawater solubility such that the pigment particles do not survive at the paint surface. The pigment has the effect of inducing the overall smoothing which the relatively-moving seawater exerts on the paint film, minimizing localized erosion and preferentially removing excrescances formed during the application of the paint. Mixtures of sparingly soluble pigments can be used, the most preferred being a mixture of zinc oxide, which is most effective at inducing the gradual dissolution of the paint, with cuprous oxide and/or cuprous thiocyanate, which are more effective marine biocides. These mixtures preferably comprise at least 25 wt. % cuprous oxide and/or thiocyanate, the balance being zinc oxide.

The paint composition can additionally contain a pigment that is highly insoluble in seawater, such as titanium dioxide or ferric oxide. Such highly insoluble pigments can be used up to about 40 percent by weight of the total pigment component of the paint. The highly insoluble pigment has the effect of retarding the dissolution of the paint.

The proportion of pigment to polymer is generally such as to give a pigment volume concentration of at least 25 percent, preferably at least 35 percent, in the dry paint film. The upper limit of pigment concentration is the critical pigment volume concentration. Paints having pigment volume concentrations of about 50 percent, for example, have been found very effective for smoothing in seawater and preventing fouling.

The paint can contain other biocides effective as antifouling agents. Examples of such biocides include di-thiocarbamate derivatives such as zinc dimethyl dithiocarbamate, zinc ethylene bis(dithiocarbamate), zinc diethyl dithiocarbamate, cuprous ethylene bis-di-thiocarbamate or 2-(N,N-dimethyl thiocarbamyl thio)-5-nitro thiazole, substituted isothiazolones particularly halogenated N-substituted isothiazolones, tetramethyl thiuram disulphide. Other known biocides include triorganotin derivatives such as tributyltin oxide, tributyltin fluoride or triphenyltin fluoride.

The invention is described further by the following examples which are intended to be illustrative and by no means limiting.

EXAMPLES

Example 1 a. Preparation of the copper resinate 765 parts by weight (pbw) of rosin were dissolved in 275 pbw of petroleum spirits (mineral spirits), heated to about 130° C., and 100 pbw of copper hydroxycarbonate were added while stirring. The temperature was increased under reflux to about 175° C. until the mixture cleared and the color changed from green to light brown. After cooling, the mixture was diluted to about 70 wt. % dry matter by adding 75 pbw of ispopropyl alcohol.

b. Preparation of the terpolymer

A terpolymer was produced by gradually adding over a period of about five hours 16.7 kg of methyl methacrylate (MMA), 8.3 kg of butyl acrylate (BA) 1 kg of tert-butyl peroxybenzoate (TBP) to a solution of 12.5 kg vinyl pyrrolidone (VP), 8.3 kg MMA and 4.2 kg BA in 40.9 kg of xylene heated at 115° C. while stirring.

After about 1 2 hours of heating, no further polymerization was observed by monitoring residual monomers using gas chromatography. The solution was then heated to 130° C. for about one hour to destroy any residual activity of the catalyst. The product was cooled and diluted with 9.1 kg of xylene to obtain an approximately 50 wt. % solution of polymer in xylene.

c. Preparation of the paint composition 4.37 pbw of the copper resinate solution were mixed with 8.53 pbw of the polymer solution, then blended with 30.96 pbw of cuprous oxide, 29.38 pbw of zinc oxide, 0.79 pbw of bentonite (as anti-settling agent), 2.18 pbw of isobutyl alcohol, and a further 23.79 pbw of xylene.

d. Evaluation of the self-polishing properties

The antifouling paint thus obtained was tested for its self-polishing properties according to the following procedure. A steel disc 20 cm in diameter was first coated with a 220 um (micron) thick dry film layer of a commercially available anti-corrosive paint based on coal tar and epoxy resin. The antifouling paint was applied as a layer having a dry film thickness of about 120 um within 48 hours from the time the anti-corrosive paint layer became dry to the touch. After drying, the disc was rotated in a tank filled with continuously renewed natural seawater at a temperature of 20° C. The circumferential speed of the disc was about 19 knots (35 km/h).

Thickness measurements were made after seven days conditioning, then 294 days thereafter, on 10 different places at 9 cm from the disc's center. The average erosion rate was 3.0 um/month.

For comparative purposes, a second steel disc coated according to the same procedure as above, and conditioned during a period of seven days. This seven day period ended on the 294th day after the commencement of conditioning on the first disc. The second disc, with the comparative coating, was compared to the first disc, with the eroded coating, to examine any self polishing effect. The eroded coating was slightly smoother than the comparative coating. The smoother surface of the eroded coating evidences good self polishing properties.

e. Evaluation of the antifouling properties

The paint thus obtained was also tested for antifouling activity by applying it to a plaque over a vinyl resins/tar anti-corrosive paint, mounting the plaque on a panel and immersing the panel from a raft in an estuary off Southern Netherlands for 12 months. Each panel also included plaques coated with a non-toxic control (which became heavily fouled with seaweed and some animal life within 4 weeks).

No weed or animal fouling was observed on the panels coated with the paint of the invention, and the algal slime was practically non-existent.

Example 2

Zinc resinate was prepared as an approximately 70 wt. % solution according to the procedure disclosed in Example 1(a), using the following proportions:

| rosin | 200 pbw |
|---|---|
| petroleum spirits | 72 pbw |
| zinc carbonate | 27 pbw |
| isopropanol | 19 pbw |

The terpolymer was prepared as described in Example 1(b).

The paint composition was:

| zinc resinate | 4.38 pbw of the 70 wt. % solution |
|---|---|
| terpolymer | 8.56 pbw of the 50 wt. % solution in xylene |
| cuprous oxide | 31.07 pbw |
| zinc oxide | 29.49 pbw |
| bentonite | 0.79 pbw |
| additional xylene | 21.72 pbw |
| isobutanol | 2.19 pbw |
| isopropanol | 0.38 pbw |
| additional petroleum | 1.42 pbw |

All properties were evaluated as described in Example 1. The average erosion rate was of 2.1 um/month. The eroded coating was slightly smoother than the reference coating. The antifouling properties were as good as those of the copper resinate-based coating.

Example 3

A paint was prepared with the following ingredients:

| rosin (undissolved) | 3.65 pbw |
|---|---|
| terpolymer (Example 1(b)) | 8.04 pbw of the 50 wt. % solution in xylene |
| cuprous oxide | 31.92 pbw |
| zinc oxide | 30.30 pbw |
| bentonite | 0.81 pbw |
| additional xylene | 19.91 pbw |
| isobutanol | 4.06 pbw |

The average erosion rate was of 3.8 um/month, and the smoothness of the eroded coating was unmodified.

Comparative examples 1 and 2

A copolymer was prepared by gradually adding over a period of about four hours 460 g of MMA, 220 g of ethyl acrylate (EA) and 20 g of TBP to a solution of 220 g MMA and 100 g EA in 1 of xylene heated at 115° C. while stirring.

After about 12 hours heating, no further polymerization was observed by monitoring residual monomers using gas chromatography. The solution was then heated to 130° C. for about one hour to destroy any residual activity of the catalyst. The product was cooled and diluted with 130 g of xylene to obtain an approximately 50 wt. % solution of polymer in xylene.

Two paint compositions were prepared:
comparative example 1: with copper resinate, as described in Example 1 (c),
comparative example 2: with rosin as described in Example 3.

When evaluating the self-polishing properties according to the procedure of Example 1(d), no erosion was observed.

This example shows that when the polymer does not satisfy the requirements of the present invention, the paint has no self-polishing properties (even though BA was replaced as comonomer by the more hydrophilic EA).

Comparative example 3

An antifouling paint was prepared from:

| | |
|---|---|
| rosin | 19.8 pbw |
| phenolic varnish, neutralized with CaO in a ball mill, used as plasticizer | 6.6 pbw |
| Calcium carbonate | 19.9 pbw |
| cuprous oxide | 27.0 pbw |
| solvents | 23.6 pbw (toluene/petroleum spirits 1:1) |
| additives | 4.0 pbw |

The paint was prepared by first incorporating the calcium carbonate in the vehicle and ball milling for 24 hours. Cuprous oxide was then added and dispersed for three hours.

When evaluating the properties as described in Example 1, it was found that the surface had become rougher. Further, after 11 months exposure to fouling, an important amount of algal slime was observed although macrofouling (barnacles, etc. ...) was rare.

Example 4 a. Preparation of the terpolymer

A copolymer was produced by gradually adding over a period of about five hours 12.7 kg methyl methacrylate (MMA), 0.7 kg methacrylate acid (MA), 13.3 kg butyl acrylate (BA) and 1 kg tert-butyl peroxybenzoate (TBP) to a solution of 10.0 kg vinyl pyrrolidone (VP), 6.3 kg MMA, 6.7 kg BA and 0.3 kg MA in a mixture of 28.6 kg xylene and 12.3 kg n-butanol heated at 105° C. while stirring.

After about 12 hours heating, no further polymerization was observed by monitoring residual monomers using gas chromatography. The solution was then heated to 130° C. for about one hour to destroy any residual activity of the catalyst. The product was cooled and diluted with 2.7 kg of n-butanol and 6.4 kg of xylene to obtain an approximately 50 wt. % solution of polymer in xylene/n-butanol.

b. Preparation of the paint composition 88 pbw of the polymer solution were mixed with 11 pbw of zinc Siccatol (Trade Mark of AKZO Chemie for a zinc salt of saturated branched-chain synthetic fatty acids, having a zinc content of 10%), then blended with 177 pbw of cuprous oxide, 58 pbw of zinc oxide, 3 pbw of bentonite (as anti-settling agent), 30 pbw of chalk, 40 pbw of isobutylalcohol, and a further 80 pbw of xylene.

c. Evaluation of the self-polishing properties

The antifouling paint thus obtained was tested for its self-polishing properties according to the following procedure. A steel disc of 20 cm diameter was first coated with a 220 um thick dry film layer of a commercially available anti-corrosive paint based on coal tar and epoxy resin. The antifouling paint was applied as a layer having a dry film thickness of about 120 um within 48 hours from the time the anti-corrosive paint layer became dry to the touch. After drying, the disc was rotated in a tank filled with continuously renewed natural seawater at a temperature of 20° C. The circumferential speed of the disc was about 19 knots (35 km/h).

Thickness measurements were made after seven days conditioning, then 91 days thereafter, on 10 different places at 9 cm from the disc's center. The average erosion rate was 6 um/month.

For comparative purposes, a second steel disc was coated according to the same procedure as above, and conditioned during a period of seven days. This seven day period ended on the 91st day after the commencement of conditioning on the first disc. The second disc, with the comparative coating, was compared to the first disc, with the eroded coating, to examine any self polishing effect. The eroded coating was slightly smoother than the comparative coating. The smoother surface of the eroded coating evidences good self polishing properties.

d. Evaluation of the antifouling properties

The paint thus obtained was also tested for antifouling activity by applying it to a plaque over a vinyl resins/tar anti-corrosive paint, mounting the plaque on a panel and immersing the panel from a raft in an estuary off Southern Netherlands for 6 months. Each panel also included plaques coated with a non-toxic control (which became heavily fouled with seaweed and some animal life within 4 weeks).

No weed or animal fouling was observed on the panels coated with the paint of the invention, and the algal slime was practically non-existent.

Example 5

68 pbw of a polymer solution prepared as in Example 4(a) were mixed with 37 pbw of copper naphtenate, then blended with 177 pbw of cuprous oxide, 17 pbw of zinc ethylene dithiocarbamate, 3 pbw of bentonite, 30 pbw of chalk, 40 pbw of isobutylalcohol, and a further 80 pbw of xylene. All properties were evaluated as described in Example 4. The average erosion rate was of 5 um/month; the eroded coating was slightly smoother than the reference coating. The antifouling properties were as good as those observed in Example 4.

We claim:

1. A marine paint composition comprising:
   (i) a compound selected from the group consisting of sparingly soluble organic acids, sparingly soluble metal salts of organic acids, and mixtures thereof;
   (ii) a copolymer prepared by the polymerization of
      (a) about 5 to 40 wt. % of at least one monomer A of the general formula

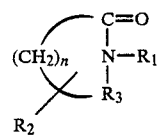

wherein $R_1$ is selected from the group consisting of hydrogen and alkyl groups when $R_2$ is an alkenyl group, $R_1$ is an alkenyl group when $R_2$ is selected from the group consisting of hydrogen and alkyl groups, $R_3$ is selected from the group consisting of methylene carbonyl and n is a positive integer, (b) about 5 to 45 wt. % of at least one acrylic comonomer B wherein the amount of monomers A+B is from about 15 to 75 wt. % of the total monomers in the polymer, and (c) about 25 to 85 wt. % of at least one comonomer C selected from the group consisting of $C_1$–$C_4$ alkyl methacrylates and styrene;

(iii) at least one sparingly soluble metalliferous pigment; and (iv) at least one marine biocide;

wherein the weight ratio of said compound (i) to said polymer (ii) is between about 1:50 and 70:30; and wherein said compound (i) contains a carboxyl group or the metal salt of a carboxyl group.

2. The composition according to claim 1 wherein at least a portion of said at least one sparingly soluble metalliferous pigment is also said at least one marine biocide.

3. The composition according to claim 1 wherein said at least one sparingly soluble metalliferous pigment contains up to about 40 wt. % of at least one pigment that is highly insoluble in sea water.

4. The composition according to claim 1 wherein said compound of (i) is selected from the group consisting of rosin-based compounds, sparingly soluble metal salts of saturated branch chain fatty acids having 6 to 12 carbon atoms, sparingly soluble metal salts of saturated alicyclic fatty acids having 6 to 12 carbon atoms, and mixtures thereof.

5. The composition according to claim 4 wherein said compounds are selected from the group consisting of copper resinates, zinc resinates, fatty acid zinc salts, fatty acid copper salts, and mixtures thereof.

6. The composition according to claim 4 wherein monomer A represents about 15 to 30 wt. % of the copolymer.

7. The composition according to claim 6 wherein monomer A is selected from the group consisting of cyclic tertiary amides having a vinyl function, cyclic tertiary amids having alkenyl function, and mixtures thereof.

8. The composition according to claim 7 wherein monomer A is selected from the group consisting of N-vinyl pyrrolidone, N-vinyl piperidone, N-vinyl caprolactam, and mixtures thereof.

9. The composition according to claim 4 wherein monomer B represents from about 15 to 40 wt. % of the copolymer.

10. The composition according to claim 9 wherein monomer B is butyl acrylate.

11. The composition according to claim 4 wherein monomer C is methyl methacrylate.

12. The composition according to claim 4 wherein said at least one sparingly soluble metalliferous pigment is selected from the group consisting of zinc oxide, cuprous oxide, cuprous thiocyanate, and mixtures thereof.

13. The composition according to claim 12 wherein said at least one sparingly soluble metalliferous pigment is a mixture of at least 25 wt. % of a pigment selected from the group consisting of cuprous oxide and cuprous thiocyanate, the balance being zinc oxide.

14. A marine paint composition comprising:
(i) at least one rosin-based compound;
(ii) a copolymer prepared by the polymerization of
(a) about 5 to 40 wt. % of at least one monomer A of the general formula

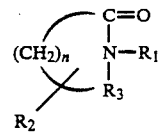

wherein $R_1$ is selected from the group consisting of hydrogen and alkyl groups when $R_2$ is an alkenyl group, $R_1$ is an alkenyl group when $R_2$ is selected from the group consisting of hydrogen and alkyl groups, $R_3$ is selected from the group consisting of methylene and carbonyl, and n is a positive integer, (b) about 5 to 45 wt. % of at least one acrylic comonomer B, wherein the amount of monomers A+B is from about 15 to 75 wt. of the total monomers in the polymer, and (c) about 25 to 85 wt. % of at least one comonomer C selected from the group consisting of $C_1$–$C_4$ alkyl methacrylates and styrene;

(iii) at least one sparingly soluble metalliferous pigment; and (iv) at least one marine biocide;

wherein the weight ratio of said rosin-based compound (i) to said copolymer (ii) is between about 10:90 and 70:30.

15. The composition according to claim 14 wherein at least a portion of said at least one sparingly soluble metalliferous pigment is also said at least one marine biocide.

16. The composition according to claim 14 wherein said at least one sparingly soluble metalliferous pigment contains up to about 40 wt. % of at least one pigment that is highly insoluble in sea water.

17. The composition according to claim 14 wherein a majority of said rosin-based compound is selected from the group consisting of abietic acid, metal salts of abietic acid, and mixtures thereof.

18. The composition according to claim 14 wherein said rosin-based compound is selected from the group consisting of rosin, copper resinate, zinc resinate, and mixtures thereof.

19. A marine paint composition comprising:
(i) a compound selected from the group consisting of sparingly soluble metal salts of saturated branched chain fatty acids having from 6 to 12 carbon atoms, metal salts of saturated alicyclic fatty acids having from 6 to 12 carbon atoms, and mixtures thereof;
(ii) a copolymer prepared by the polymerization of
(a) about 5 to 40 wt. % of at least one monomer A of the general formula

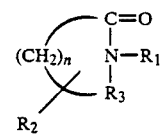

wherein $R_1$ is selected from the group consisting of hydrogen and alkyl groups when $R_2$ is an, alkenyl group, $R_1$ is an alkenyl group when $R_2$ is selected from the group consisting of hydrogen and alkyl groups, $R_3$ is selected from the group consisting of methylene and carbonyl, and n is a positive integer, about 5 to 45 wt. % of at least one acrylic comonomer B, wherein the amount of monomers A+B is from about 15 to 75 wt. % of the total monomers in the polymer, and about 25 to 85 wt. % of at least one comonomer C selected from the group consisting of $C_1$-$C_4$ alkyl methacrylates and styrene;

(iii) at least one sparingly soluble metalliferous pigment; and (iv) at least one marine biocide;

wherein the weight ratio of said compound (i) to said copolymer (ii) is between about 1:50 and 1:1.

20. The composition according to claim 19 wherein at least a portion of said at least one sparingly soluble metalliferous pigment is also said at least one marine biocide.

21. The composition according to claim 19 wherein said at least one sparingly soluble metalliferous pigment contains up to about 40 wt. % of at least one pigment that is highly insoluble in sea water.

22. The composition according to claim 19 wherein said metal salts are transition metal salts.

23. The composition according to claim 22 wherein said metal salts are selected from the group consisting of zinc, copper, cobalt, zirconium salts and mixtures thereof.

24. The compositions according to claim 19 wherein the copolymer of (ii) contains up to about 5 wt. % of an additional monomer selected from the group consisting of acrylic and methacrylic acid replacing the corresponding ester.

25. A self-polishing, antifouling marine paint comprising:

(i) a compound selected from the group consisting of sparingly soluble organic acids, sparingly soluble metal salts of organic acids, and mixtures thereof;

(ii) a non-reactive binder that is a copolymer prepared by the polymerization of (a) an amount of at least one monomer A of the general formula

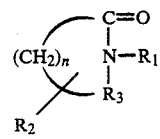

wherein $R_1$ is selected from H and alkyl groups when $R_2$ is an alkenyl group, $R_1$ is an alkenyl group when $R_2$ is selected from hydrogen and alkyl groups, $R_3$ is selected from methylene and carbonyl, and n is a positive integer, wherein said amount is an amount sufficient to be self polishing but yet not sufficient to cause swelling, (b) an amount of at least one acrylic comonomer B which amount is not sufficient to produce an excessively soft coating, and (c) at least one comonomer C is selected from the group consisting of $C_1$-$C_4$ alkyl metharylates and styrene (iii) at least one sparingly soluble metalliferous pigment; and (iv) at least one marine biocide; wherein said compound (i) contains a carboxyl group or the metal salt of a carboxyl group.

26. The composition according to claim 25 wherein said compound of (i) is selected from the group consisting of rosin-based compounds, sparingly soluble metal salts of saturated branch chain fatty acids having 6 to 12 carbon atoms, sparingly soluble metal salts of saturated alicylic fatty acids having 6 to 12 carbon atoms, and mixtures thereof.

* * * * *